US007680656B2

(12) United States Patent
Zhang et al.

(10) Patent No.: US 7,680,656 B2
(45) Date of Patent: Mar. 16, 2010

(54) MULTI-SENSORY SPEECH ENHANCEMENT USING A SPEECH-STATE MODEL

(75) Inventors: Zhengyou Zhang, Bellevue, WA (US); Zicheng Liu, Bellevue, WA (US); Alejandro Acero, Bellevue, WA (US); Amarnag Subramanya, Seattle, WA (US); James G. Droppo, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1126 days.

(21) Appl. No.: 11/168,770

(22) Filed: Jun. 28, 2005

(65) Prior Publication Data

US 2006/0293887 A1 Dec. 28, 2006

(51) Int. Cl.
*G10L 15/00* (2006.01)
*G10L 15/20* (2006.01)

(52) U.S. Cl. ........................ 704/233; 704/240; 704/231

(58) Field of Classification Search ................. 704/231, 704/233, 240

See application file for complete search history.

(56) References Cited

U.S. PATENT DOCUMENTS

| | | | | | |
|---|---|---|---|---|---|
| 3,383,466 | A | | 5/1968 | Hilix et al. | 179/1 |
| 3,746,789 | A | | 7/1973 | Alcivar | 179/1 |
| 3,787,641 | A | | 1/1974 | Santori | 179/107 |
| 4,025,721 | A | * | 5/1977 | Graupe et al. | 704/227 |
| 5,054,079 | A | | 10/1991 | Frielingsdorf et al. | 381/151 |
| 5,148,488 | A | * | 9/1992 | Chen et al. | 704/219 |
| 5,151,944 | A | | 9/1992 | Yamamura | 381/151 |
| 5,197,091 | A | | 3/1993 | Takagi et al. | 379/433.12 |
| 5,295,193 | A | | 3/1994 | Ono | 381/151 |
| 5,404,577 | A | | 4/1995 | Zuckerman et al. | 455/66 |
| 5,446,789 | A | | 8/1995 | Loy et al. | |
| 5,555,449 | A | | 9/1996 | Kim | 379/433.03 |
| 5,590,241 | A | | 12/1996 | Park et al. | 395/2.36 |
| 5,647,834 | A | | 7/1997 | Ron | 600/23 |
| 5,692,059 | A | | 11/1997 | Kruger | 381/151 |
| 5,727,124 | A | * | 3/1998 | Lee et al. | 704/233 |
| 5,757,934 | A | | 5/1998 | Yokoi | 381/68.3 |
| 5,828,768 | A | | 10/1998 | Eatwell et al. | 381/333 |
| 5,873,728 | A | | 2/1999 | Jeong | 434/185 |
| 5,884,257 | A | * | 3/1999 | Maekawa et al. | 704/248 |
| 5,933,506 | A | | 8/1999 | Aoki et al. | 381/151 |

(Continued)

FOREIGN PATENT DOCUMENTS

DE 199 17 169 11/2000

(Continued)

OTHER PUBLICATIONS

Search Report and Written Opinion in foreign application No. PCT/US2006/22863 filed Jun. 13, 2006.

(Continued)

*Primary Examiner*—James S Wozniak
(74) *Attorney, Agent, or Firm*—Theodore M. Magee; Westman, Champlin & Kelly, P.A.

(57) ABSTRACT

A method and apparatus determine a likelihood of a speech state based on an alternative sensor signal and an air conduction microphone signal. The likelihood of the speech state is used, together with the alternative sensor signal and the air conduction microphone signal, to estimate a clean speech value for a clean speech signal.

13 Claims, 6 Drawing Sheets

U.S. PATENT DOCUMENTS

| | | | | |
|---|---|---|---|---|
| 5,943,627 | A | 8/1999 | Kim et al. | 379/426 |
| 5,983,073 | A | 11/1999 | Ditzik | 455/11.1 |
| 6,028,556 | A | 2/2000 | Shiraki | 343/702 |
| 6,052,464 | A | 4/2000 | Harris et al. | 379/433 |
| 6,052,567 | A | 4/2000 | Ito et al. | 455/90 |
| 6,091,972 | A | 7/2000 | Ogasawara | 455/575.7 |
| 6,094,492 | A | 7/2000 | Boesen | 381/312 |
| 6,125,284 | A | 9/2000 | Moore et al. | 455/557 |
| 6,137,883 | A | 10/2000 | Kaschke et al. | 379/433.07 |
| 6,175,633 | B1 | 1/2001 | Morrill et al. | 381/71.6 |
| 6,243,596 | B1 | 6/2001 | Kikinis | 429/8 |
| 6,308,062 | B1 | 10/2001 | Chien et al. | 455/420 |
| 6,339,706 | B1 | 1/2002 | Tillgren et al. | 455/419 |
| 6,343,269 | B1 | 1/2002 | Harada et al. | 704/243 |
| 6,408,081 | B1 | 6/2002 | Boesen | 381/312 |
| 6,408,269 | B1 * | 6/2002 | Wu et al. | 704/228 |
| 6,411,933 | B1 | 6/2002 | Maes et al. | 704/273 |
| 6,542,721 | B2 | 4/2003 | Boesen | 455/90 |
| 6,560,468 | B1 | 5/2003 | Boesen | 455/568 |
| 6,594,629 | B1 | 7/2003 | Basu et al. | 704/251 |
| 6,664,713 | B2 | 12/2003 | Boesen | 310/328 |
| 6,675,027 | B1 | 1/2004 | Huang | 455/575 |
| 6,760,600 | B2 | 7/2004 | Nickum | 455/557 |
| 6,778,954 | B1 | 8/2004 | Kim et al. | 704/226 |
| 7,054,423 | B2 | 5/2006 | Nebiker et al. | 379/201.01 |
| 7,110,722 | B2 * | 9/2006 | Godsill et al. | 704/231 |
| 7,146,315 | B2 * | 12/2006 | Balan et al. | 704/233 |
| 7,453,963 | B2 * | 11/2008 | Joublin et al. | 704/224 |
| 2001/0027121 | A1 | 10/2001 | Boesen | 455/556 |
| 2001/0039195 | A1 | 11/2001 | Nickum | 455/557 |
| 2002/0057810 | A1 | 5/2002 | Boesen | |
| 2002/0075306 | A1 | 6/2002 | Thompson et al. | |
| 2002/0181669 | A1 | 12/2002 | Takatori et al. | |
| 2002/0196955 | A1 | 12/2002 | Boesen | |
| 2002/0198021 | A1 | 12/2002 | Boesen | 455/556 |
| 2003/0040908 | A1 | 2/2003 | Yang et al. | |
| 2003/0083112 | A1 | 5/2003 | Fukuda | 455/568 |
| 2003/0125081 | A1 | 7/2003 | Boesen | 455/556 |
| 2003/0144844 | A1 | 7/2003 | Colmenarez et al. | 704/273 |
| 2004/0002858 | A1 | 1/2004 | Attias et al. | 704/226 |
| 2004/0092297 | A1 | 5/2004 | Huang | |
| 2004/0111260 | A1 | 6/2004 | Deligne et al. | 704/233 |
| 2004/0267536 | A1 * | 12/2004 | Hershey et al. | 704/276 |
| 2005/0114124 | A1 | 5/2005 | Liu et al. | |
| 2005/0185813 | A1 | 8/2005 | Sinclair et al. | |
| 2006/0008256 | A1 | 1/2006 | Khedouri et al. | 386/124 |
| 2006/0009156 | A1 | 1/2006 | Hayes et al. | 455/63.1 |
| 2006/0072767 | A1 | 4/2006 | Zhang et al. | 381/71.6 |
| 2006/0079291 | A1 | 4/2006 | Granovetter et al. | 455/563 |
| 2006/0178880 | A1 | 8/2006 | Zhang et al. | |

FOREIGN PATENT DOCUMENTS

| | | | |
|---|---|---|---|
| EP | 0 720 338 | A2 | 7/1996 |
| EP | 0 854 535 | A2 | 7/1998 |
| EP | 0 939 534 | A1 | 9/1999 |
| EP | 0 951 883 | | 10/1999 |
| EP | 1 333 650 | | 8/2003 |
| EP | 1 569 422 | | 8/2005 |
| FR | 2 761 800 | | 4/1997 |
| GB | 2 375 276 | | 11/2002 |
| GB | 2 390 264 | | 12/2003 |
| JP | 3108997 | | 5/1991 |
| JP | 5276587 | | 10/1993 |
| JP | 8065781 | | 3/1996 |
| JP | 8070344 | | 3/1996 |
| JP | 8079868 | | 3/1996 |
| JP | 10-023122 | | 1/1998 |
| JP | 10-023123 | | 1/1998 |
| JP | 11265199 | | 9/1999 |
| JP | 2001119797 | | 10/1999 |
| JP | 2001245397 | | 2/2000 |
| JP | 20002-09688 | | 7/2000 |
| JP | 2000196723 | | 7/2000 |
| JP | 2000261529 | | 9/2000 |
| JP | 2000261530 | | 9/2000 |
| JP | 2000261534 | | 9/2000 |
| JP | 2000354284 | | 12/2000 |
| JP | 2001292489 | | 10/2001 |
| JP | 2002-125298 | | 4/2002 |
| JP | 2002-358089 | | 12/2002 |
| WO | WO 93/01664 | | 1/1993 |
| WO | WO 95/17746 | | 6/1995 |
| WO | WO 00/21194 | | 10/1998 |
| WO | WO 99/04500 | | 1/1999 |
| WO | WO 00/45248 | | 8/2000 |
| WO | WO 02/77972 | A1 | 3/2002 |
| WO | WO 02/098169 | A1 | 12/2002 |
| WO | WO 03/055270 | A1 | 3/2003 |

OTHER PUBLICATIONS

U.S. Appl. No. 10/629,278, filed Jul. 29, 2003, Huang et al.
U.S. Appl. No. 10/785,768, filed Feb. 24, 2004, Sinclair et al.
U.S. Appl. No. 10/636,176, filed Aug. 7, 2003, Huang et al.
Zheng Y. et al., "Air and Bone-Conductive Integrated Microphones for Robust Speech Detection and Enhancement" Automatic Speech Recognition and Understanding 2003. pp. 249-254.
De Cuetos P. et al. "Audio-visual intent-to-speak detection for human-computer interaction" vol. 6, Jun. 5, 2000. pp. 2373-2376.
M. Graciarena, H. Franco, K. Sonmez, and H. Bratt, "Combining Standard and Throat Microphones for Robust Speech Recognition," IEEE Signal Processing Letters, vol. 10, No. 3, pp. 72-74, Mar. 2003.
P. Heracleous, Y. Nakajima, A. Lee, H. Saruwatari, K. Shikano, "Accurate Hidden Markov Models for Non-Audible Murmur (NAM) Recognition Based on Iterative Supervised Adaptation," ASRU 2003, St. Thomas, U.S. Virgin Islands, Nov. 20-Dec. 4, 2003.
O.M. Strand, T. Holter, A. Egeberg, and S. Stensby, "On the Feasibility of ASR in Extreme Noise Using the PARAT Earplug Communication Terminal," ASRU 2003, St. Thomas, U.S. Virgin Islands, Nov. 20-Dec. 4, 2003.
Z. Zhang, Z. Liu, M. Sinclair, A. Acero, L. Deng, J. Droppo, X. D. Huang, Y. Zheng, "Multi-Sensory Microphones For Robust Speech Detection, Enchantment, and Recognition," ICASSP 04, Montreal, May 17-21, 2004.
Bakar, "The Insight of Wireless Communication;" Research and Development, 2002, Student Conference on Jul. 16-17, 2002.
Search Report dated Dec. 17, 2004 from International Application No. 04016226.5.
European Search Report from Application No. 05107921.8, filed Aug. 30, 2005.
European Search Report from Application No. 05108871.4, filed Sep. 26, 2005.
http://www.snaptrack.com/ (2004).
http://www.misumi.com.tw/PLIST.ASP?PC.ID:21 (2004).
http://www.wherifywireless.com/univLoc.asp (2001).
http://www.wherifywireless.com/prod.watches.htm (2001).
Microsoft Office, Live Communications Server 2003, Microsoft Corporation, pp. 1-10, 2003.
Shoshana Berger, http://www.cnn.com/technology, "Wireless, wearable, and wondrous tech," Jan. 17, 2003.
http://www.3G.co.uk, "NTT DoCoMo to Introduce First Wireless GPS Handset," Mar. 27, 2003.
"Physiological Monitoring System 'Lifeguard' System Specifications," Stanford University Medical Center, National Biocomputation Center, Nov. 8, 2002.
Nagl, L., "Wearable Sensor System for Wireless State-of-Health Determination in Cattle," Annual International Conference of the Institute of Electrical and Electronics Engineers' Engineering in Medicine and Biology Society, 2003.
Asada, H. and Barbagelata, M., "Wireless Fingernail Sensor for Continuous Long Term Health Monitoring," MIT Home Automation and Healthcare Consortium, Phase 3, Progress Report No. 3-1, Apr. 2001.

Kumar, V., "The Design and Testing of a Personal Health System to Motivate Adherence to Intensive Diabetes Management," Harvard-MIT Division of Health Sciences and Technology, pp. 1-66, 2004.
U.S. Appl. No. 11/156,434, filed Jun. 20, 2005, Zicheng et al.
"Direct Filtering for Air-and Bone-Conductive Microphones," Zicheng Liu et al., Multimedia Signal Processing, 2004, IEEE 6$^{th}$ Workshop on Siena, Italy, pp. 363-366.
"Air-and Bone-Conductive Integrated Microphones for Robust Speech Detection and Enhancement," Yanli Zheng et al., Automatic Speech Recognition and Understanding, 2003, 249-254.
European Search Report from Appln No. 06100071.7, filed Jan. 4, 2006.
Z. Liu et al., "Leakage Model and Teeth Clack Removal for Air-and Bone-Conductive Integrated Microphones," in Proc. of the Int. Conf. on Acoustics, Speech and Signal Processing, Philadelphia, Mar. 2005.
J. Hershey et al., "Model-based Fusion of Bone and Air Sensors for speech Enhancement and Robust Speech Recognition," in Proc. ISCA Tutorial and research Workshops on Statistical and Perceptual Audio Processing, Jeju, South Korea, Oct. 2004.
L. Deng et al., "Nonlinear Information Fusion in Multi-sensor Processing—Extracting and Exploiting Hidden Dynamics of Speech Captured by a Bone-Conductive Microphone," in Proc. IEEE International Workshop on Multimedia Signal Processing, Siena, Italy, Sep. 2004.

* cited by examiner

MULTI-SENSORY SPEECH ENHANCEMENT USING A SPEECH-STATE MODEL

BACKGROUND

A common problem in speech recognition and speech transmission is the corruption of the speech signal by additive noise. In particular, corruption due to the speech of another speaker has proven to be difficult to detect and/or correct.

Recently, systems have been developed that attempt to remove noise by using a combination of an alternative sensor, such as a bone conduction microphone, and an air conduction microphone. Various techniques have been developed that use the alternative sensor signal and the air conduction microphone signal to form an enhanced speech signal that has less noise than the air conduction microphone signal. However, perfectly enhanced speech has not been achieved and further advances in the formation of enhanced speech signals are needed.

SUMMARY

A method and apparatus determine a likelihood of a speech state based on an alternative sensor signal and an air conduction microphone signal. The likelihood of the speech state is used to estimate a clean speech value for a clean speech signal.

DETAILED DESCRIPTION OF ILLUSTRATIVE EMBODIMENTS

Figure 1:
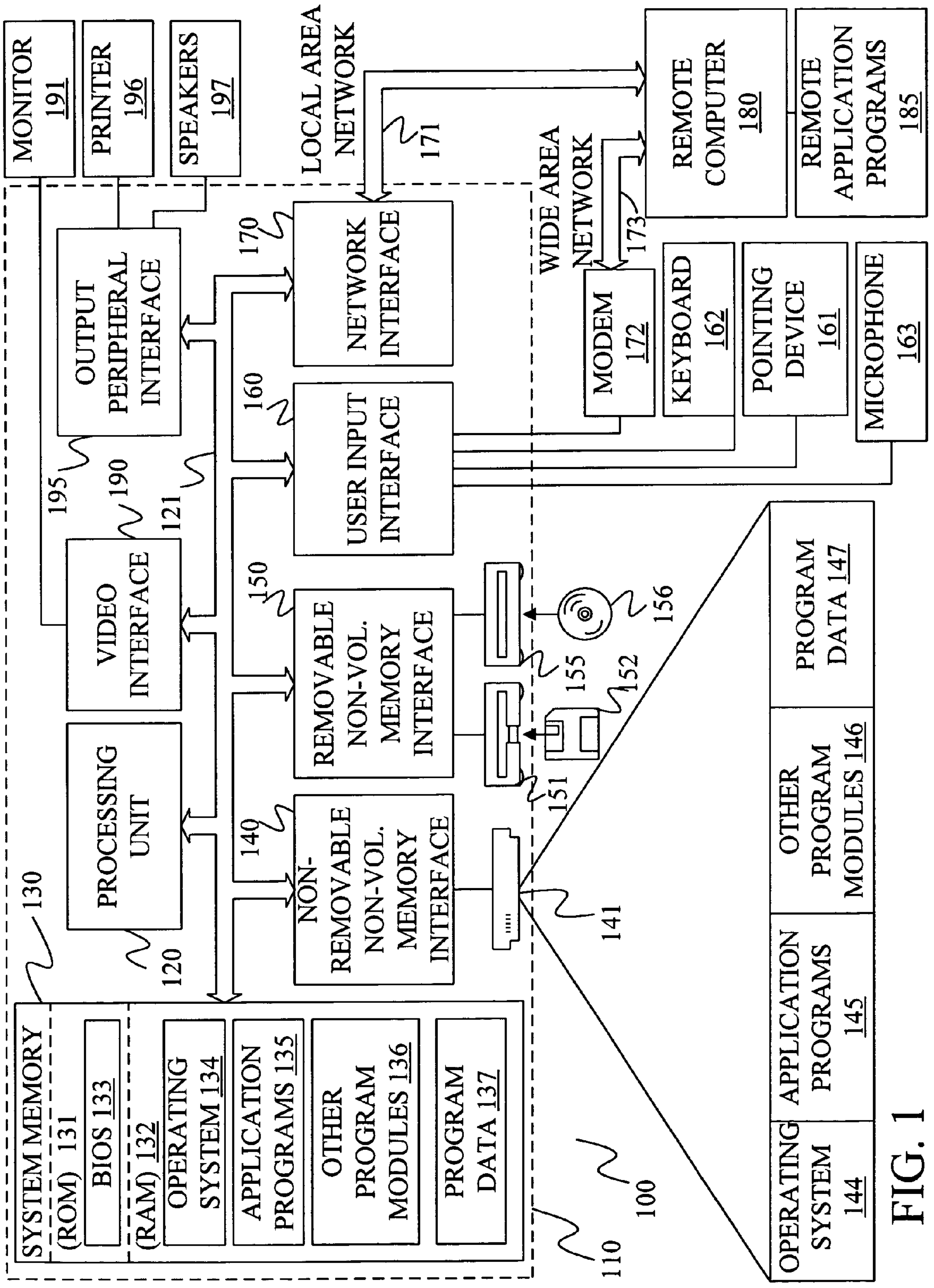
FIG. 1 is a block diagram of one computing environment in which embodiments of the present invention may be practiced.

FIG. 1 illustrates an example of a suitable computing system environment 100 on which embodiments of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
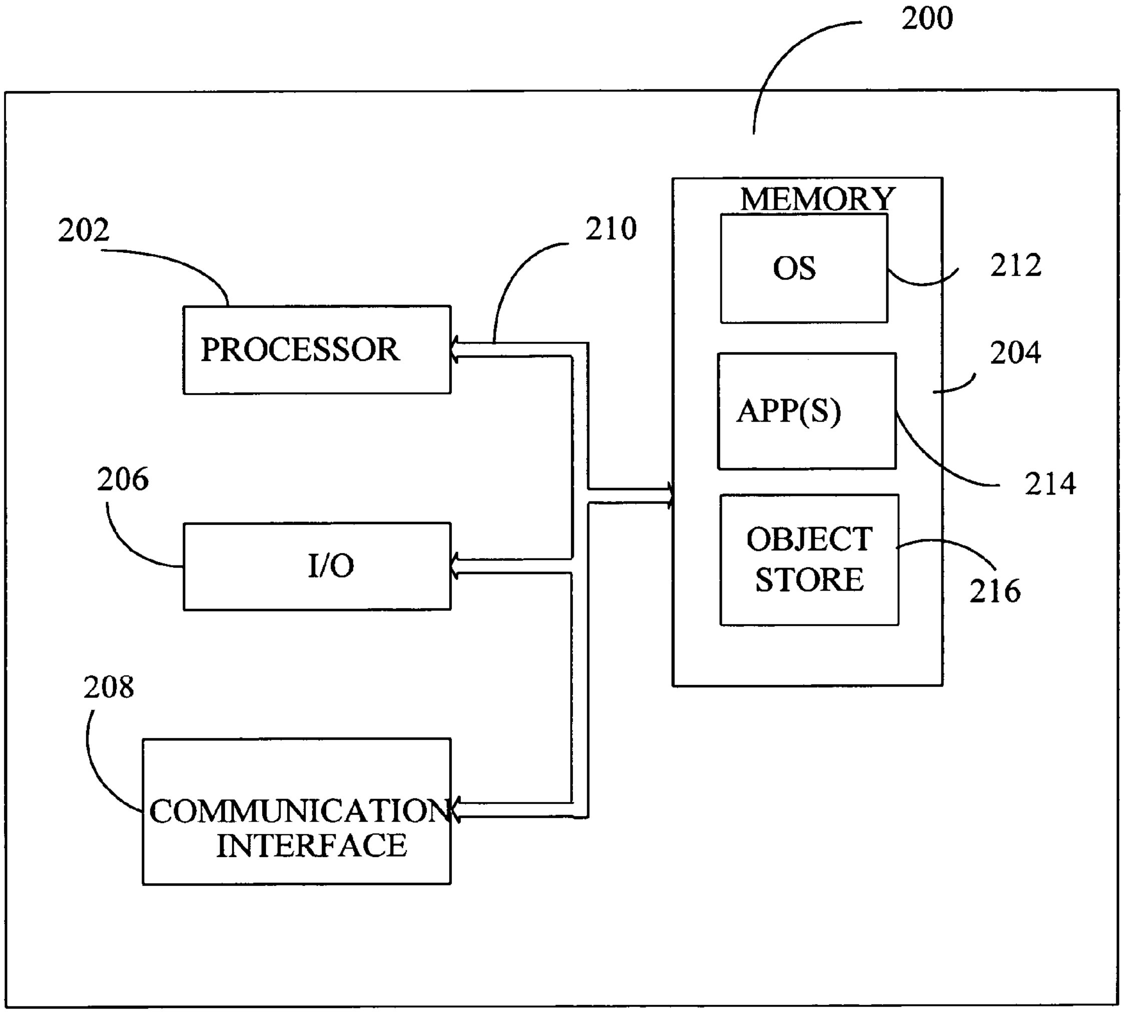
FIG. 2 is a block diagram of an alternative computing environment in which embodiments of the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
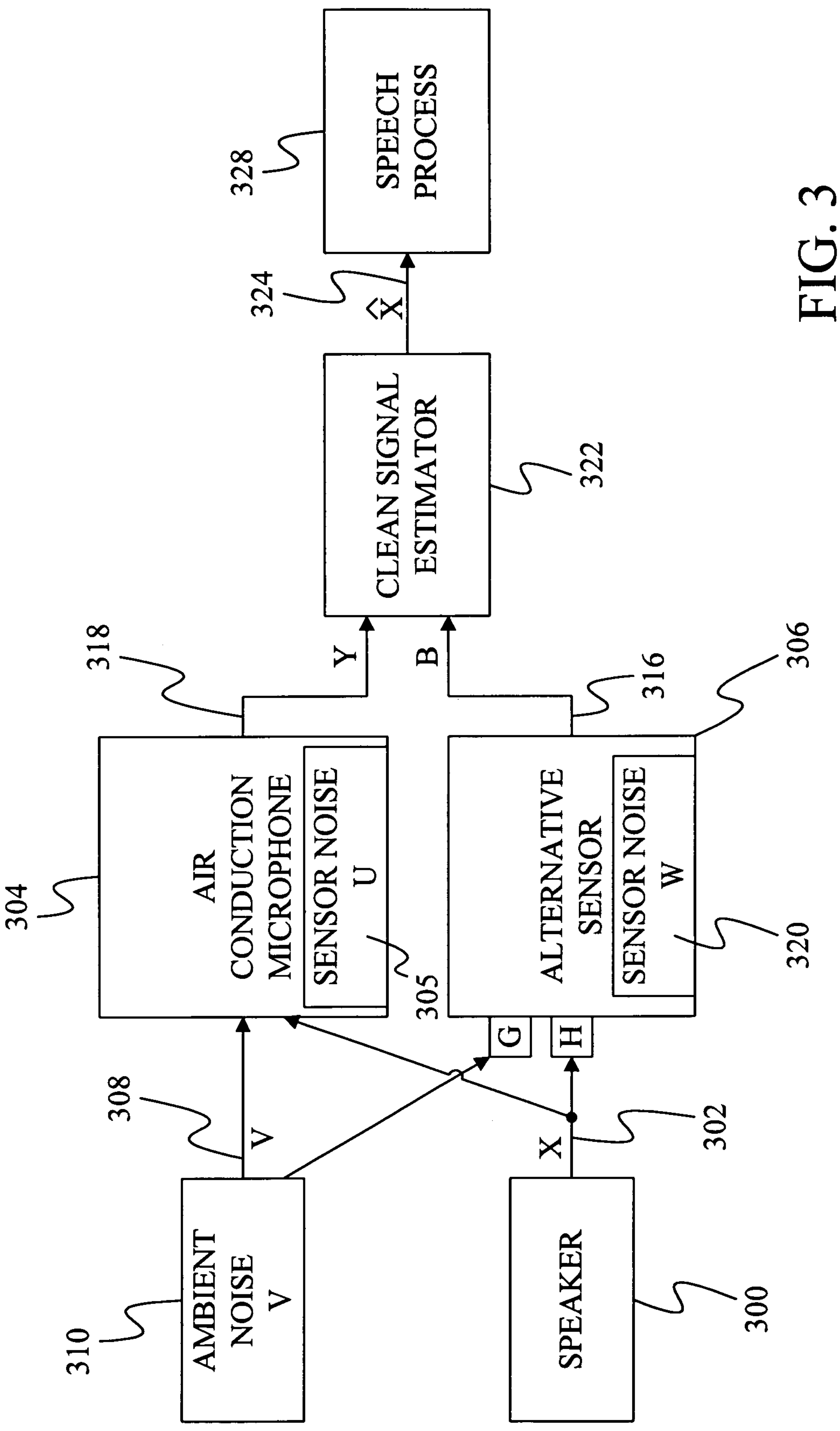
FIG. 3 is a block diagram of a general speech processing system of the present invention.

FIG. 3 provides a basic block diagram of embodiments of the present invention. In FIG. 3, a speaker 300 generates a speech signal 302 (X) that is detected by an air conduction microphone 304 and an alternative sensor 306. Examples of alternative sensors include a throat microphone that measures the user's throat vibrations, a bone conduction sensor that is located on or adjacent to a facial or skull bone of the user (such as the jaw bone) or in the ear of the user and that senses vibrations of the skull and jaw that correspond to speech generated by the user. Air conduction microphone 304 is the type of microphone that is used commonly to convert audio air-waves into electrical signals.

Air conduction microphone 304 receives ambient noise 308 (V) generated by one or more noise sources 310 and generates its own sensor noise 305 (U). Depending on the type of ambient noise and the level of the ambient noise, ambient noise 308 may also be detected by alternative sensor 306. However, under embodiments of the present invention, alternative sensor 306 is typically less sensitive to ambient noise than air conduction microphone 304. Thus, the alternative sensor signal 316 (B) generated by alternative sensor 306 generally includes less noise than air conduction microphone signal 318 (Y) generated by air conduction microphone 304. Although alternative sensor 306 is less sensitive to ambient noise, it does generate some sensor noise 320 (W).

The path from speaker 300 to alternative sensor signal 316 can be modeled as a channel having a channel response H. The path from ambient noise 308 to alternative sensor signal 316 can be modeled as a channel having a channel response G.

Alternative sensor signal 316 (B) and air conduction microphone signal 318 (Y) are provided to a clean signal estimator 322, which estimates a clean signal 324. Clean signal estimate 324 is provided to a speech process 328. Clean signal estimate 324 may either be a time-domain signal or a Fourier Transform vector. If clean signal estimate 324 is a time-domain signal, speech process 328 may take the form of a listener, a speech coding system, or a speech recognition system. If clean signal estimate 324 is a Fourier Transform vector, speech process 328 will typically be a speech recognition system, or contain an Inverse Fourier Transform to convert the Fourier Transform vector into waveforms.

Figure 4:
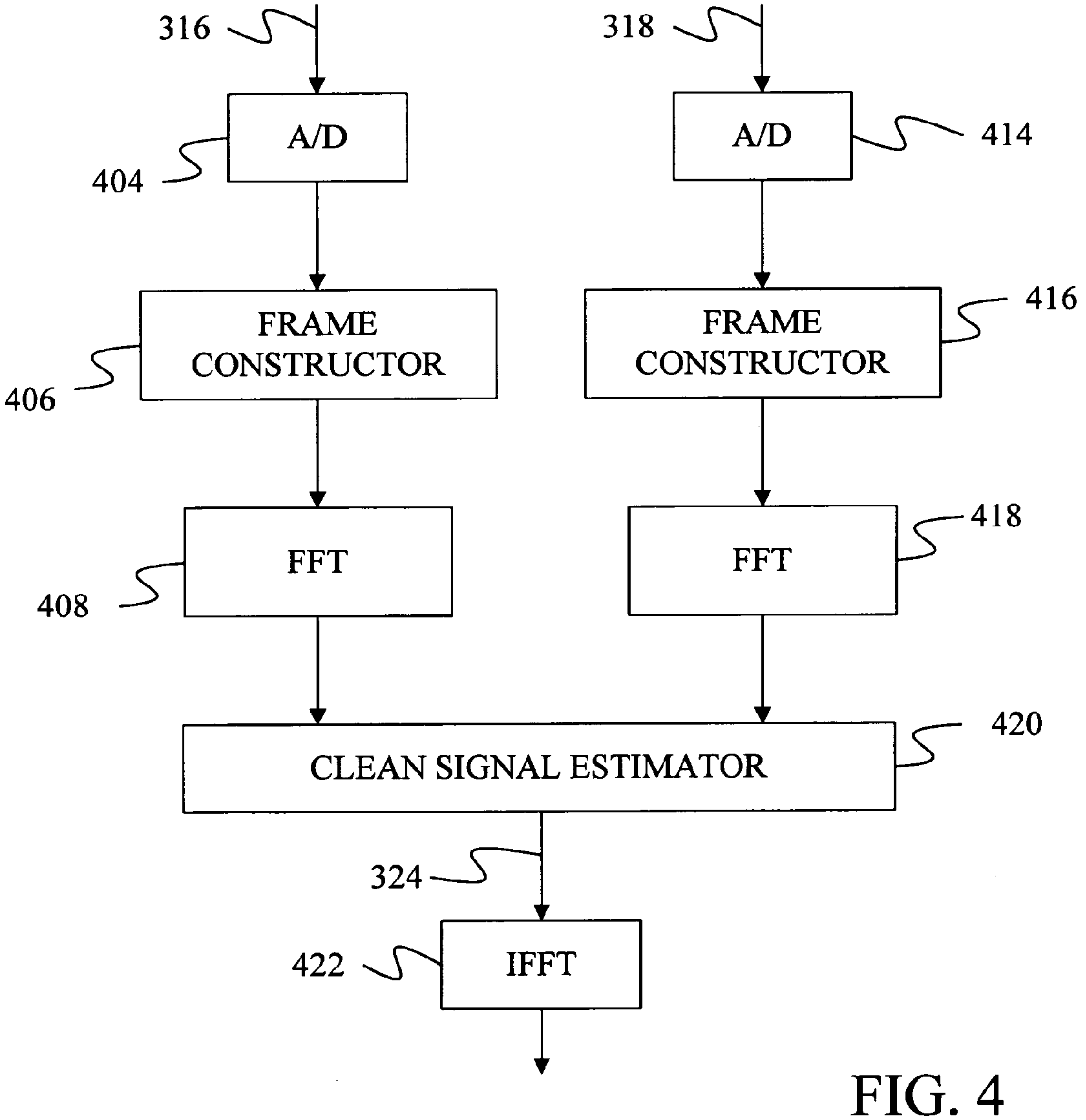
FIG. 4 is a block diagram of a system for enhancing speech under one embodiment of the present invention.

Within clean signal estimator 322, alternative sensor signal 316 and microphone signal 318 are converted into the frequency domain being used to estimate the clean speech. As shown in FIG. 4, alternative sensor signal 316 and air conduction microphone signal 318 are provided to analog-to-digital converters 404 and 414, respectively, to generate a sequence of digital values, which are grouped into frames of values by frame constructors 406 and 416, respectively. In one embodiment, A-to-D converters 404 and 414 sample the analog signals at 16 kHz and 16 bits per sample, thereby creating 32 kilobytes of speech data per second and frame constructors 406 and 416 create a new respective frame every 10 milliseconds that includes 20 milliseconds worth of data.

Each respective frame of data provided by frame constructors 406 and 416 is converted into the frequency domain using Fast Fourier Transforms (FFT) 408 and 418, respectively.

The frequency domain values for the alternative sensor signal and the air conduction microphone signal are provided to clean signal estimator 420, which uses the frequency domain values to estimate clean speech signal 324.

Under some embodiments, clean speech signal 324 is converted back to the time domain using Inverse Fast Fourier Transforms 422. This creates a time-domain version of clean speech signal 324.

Figure 5:
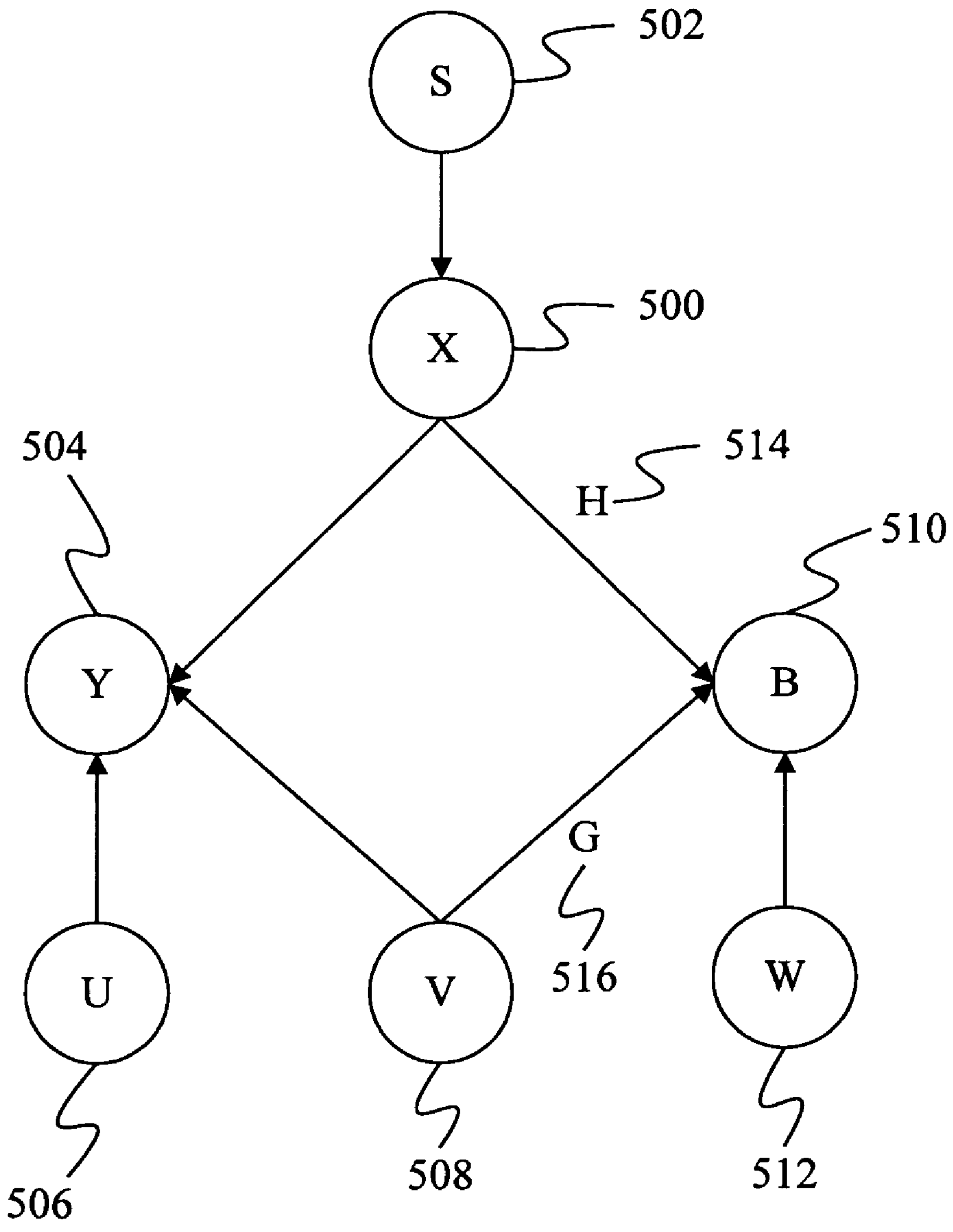
FIG. 5 is a model on which speech enhancement is based under one embodiment of the present invention.

The present invention utilizes a model of the system of FIG. 3 that includes speech states for the clean speech in order to produce an enhanced speech signal. FIG. 5 provides a graphical representation of the model.

In the model of FIG. 5, clean speech 500 is dependent upon a speech state 502. Air conduction microphone signal 504 is dependent on sensor noise 506, ambient noise 508 and clean speech signal 500. Alternative sensor signal 510 is dependent on sensor noise 512, clean speech signal 500 as it passes through a channel response 514 and ambient noise 508 as it passes through a channel response 516.

The model of FIG. 5 is used under the present invention to estimate a clean speech signal $X_t$ from noisy observations $Y_t$ and $B_t$ and identifies the likelihood of a plurality of speech states $S_t$.

Under one embodiment of the present invention, the clean speech signal estimate and the likelihoods of the states for the clean speech signal estimate are formed by first assuming Gaussian distributions for the noise components in the system model. Thus:

$$V \sim N(0, g^2\sigma_v^2) \quad \text{EQ. 1}$$

$$U \sim N(0, \sigma_u^2) \quad \text{EQ. 2}$$

$$W \sim N(0, \sigma_w^2) \quad \text{EQ. 3}$$

where each noise component is modeled as a zero-mean Gaussian having respective variances $g^2\sigma_v^2$, $\sigma_u^2$, and $\sigma_w^2$, V is the ambient noise, U is the sensor noise in the air conduction microphone, and W is the sensor noise in the alternative sensor. In EQ. 1, g is a tuning parameter that allows the variance of the ambient noise to be tuned.

In addition, this embodiment of the present invention models the probability of the clean speech signal given a state as a zero-mean Gaussian with a variance $\sigma_s^2$ such that:

$$X|(S=s) \sim N(0, \sigma_s^2) \quad \text{EQ. 4}$$

Under one embodiment of the present invention, the prior probability of a given state is assumed to be a uniform probability such that all states are equally likely. Specifically, the prior probability is defined as:

$$P(s_t) = \frac{1}{N_s} \quad \text{EQ. 5}$$

where $N_s$ is the number of speech states available in the model.

In the description of the equations below for determining the estimate of the clean speech signal and the likelihood of the speech states, all of the variables are modeled in the complex spectral domain. Each frequency component (Bin) is treated independently of the other frequency components. For ease of notation, the method is described below for a single frequency component. Those skilled in the art will recognize that the computations are performed for each frequency component in the spectral version of the input signals. For variables that vary with time, a subscript t is added to the variable.

To estimate the clean speech signal $X_t$ from the noisy observations $Y_t$ and $B_t$, the present invention maximizes the conditional probability $p(X_t|Y_t,B_t)$, which is the probability of the clean speech signal given the noisy air conduction microphone signal and the noisy alternative sensor signal. Since the estimate of the clean speech signal depends on the speech state $S_t$ under the model, this conditional probability is determined as:

$$p(X_t|Y_t, B_t) = \sum_{s \in \{S\}} p(X_t|Y_t, B_t, S_t = s)p(S_t = s|Y_t, B_t) \quad \text{EQ. 6}$$

where {S} denotes the set of all speech states, $p(X_t|Y_t,B_t,S_t=s)$ is the likelihood of $X_t$ given the current noisy observations and the speech state s, and $p(S_t=s|Y_t,B_t)$ is the likelihood of the speech state s given the noisy observations. Any number of possible speech states may be used under the present invention, including speech states for voiced sounds, fricatives, nasal sounds and back vowel sounds. In some embodiments, a separate speech state is provided for each of a set of phonetic units, such as phonemes. Under one embodiment, however, only two speech states are provided, one for speech and one for non-speech.

Under some embodiments, a single state is used for all of the frequency components. Therefore, each frame has a single speech state variable.

The terms on the right hand side of EQ. 6 can be calculated as:

$$p(X_t|Y_t, B_t, S_t = s) = \frac{p(X_t, Y_t, B_t, S_t = s)}{p(Y_t, B_t, S_t = s)} \propto p(X_t, Y_t, B_t, S_t = s) \qquad \text{EQ. 7}$$

$$p(S_t = s|Y_t, B_t) = \int_x \frac{p(X_t, Y_t, B_t, S_t = s)}{p(Y_t, B_t)} dX \propto \int_x p(X_t, Y_t, B_t, S_t = s) dX \qquad \text{EQ. 8}$$

which indicate that the conditional probability of the clean speech signal given the observations can be estimated by the joint probability of the clean speech signal, the observations and the state and that the conditional probability of the state given the observations can be approximated by integrating the joint probability of the clean speech signal, the observations and the state over all possible clean speech values.

Using the Gaussian assumptions for the distributions of the noise discussed above in equations 1-3, the joint probability of the clean speech signal, the observations and the state can be computed as:

$$p(X_t, S_t, Y_t, B_t) = N(Y_t; X_t, \sigma_u^2 + g^2\sigma_v^2)p(X_t|S_t)p(S_t) \cdot N\left(G\frac{g^2\sigma_v^2(Y_t - X_t)}{\sigma_u^2 + g^2\sigma_v^2}; B_t - HX_t, \sigma_w^2 + |G|^2\frac{g^2\sigma_v^2\sigma_u^2}{\sigma_u^2 + g^2\sigma_v^2}\right) \qquad \text{EQ. 9}$$

where $p(X_t|S_t=s)=N(X_t; 0,\sigma_s^2)$, $p(S_t)$ is the prior probability of the state which is given by the uniform probability distribution in EQ. 5, G is the channel response of the alternative sensor to the ambient noise, H is the channel response of the alternative sensor signal to the clean speech signal, and complex terms between vertical bars such as, |G|, indicate the magnitude of the complex value.

The alternative sensor's channel response G for background speech is estimated from the signals of the air microphone Y and of the alternative sensor B across the last D frames in which the user is not speaking. Specifically, G is determined as:

$$G = \frac{\sum_{t=1}^{D}(\sigma_u^2|B_t|^2 - \sigma_w^2|Y_t|^2) \pm \sqrt{\left(\sum_{t=1}^{D}(\sigma_u^2|B_t|^2 - \sigma_w^2|Y_t|^2)\right)^2 + 4\sigma_u^2\sigma_w^2\left|\sum_{t=1}^{D}B_t^*Y_t\right|^2}}{2\sigma_u^2\sum_{t=1}^{D}B_t^*Y_t} \qquad \text{Eq. 10}$$

where D is the number of frames in which the user is not speaking but there is background speech. Here, we assume that G is constant across all time frames D. In other embodiments, instead of using all the D frames equally, we use a technique known as "exponential aging" so that the latest frames contribute more to the estimation of G than the older frames.

The alternative sensor's channel response H for the clean speech signal is estimated from the signals of the air microphone Y and of the alternative sensor B across the last T frames in which the user is speaking. Specifically, H is determined as:

$$H = \frac{\sum_{t=1}^{T}(g^2\sigma_v^2|B_t|^2 - \sigma_w^2|Y_t|^2) \pm \sqrt{\left(\sum_{t=1}^{T}(g^2\sigma_v^2|B_t|^2 - \sigma_w^2|Y_t|^2)\right)^2 + 4g^2\sigma_v^2\sigma_w^2\left|\sum_{t=1}^{T}B_t^*Y_t\right|^2}}{2g^2\sigma_v^2\sum_{t=1}^{T}B_t^*Y_t} \qquad \text{Eq. 11}$$

where T is the number of frames in which the user is speaking. Here, we assume that H is constant across all time frames T. In other embodiments, instead of using all the T frames equally, we use a technique known as "exponential aging" so that the latest frames contribute more to the estimation of H than the older frames.

The conditional likelihood of the state $p(S_t=s|Y_t,B_t)$ is computed using the approximation of EQ. 8 and the joint probability calculation of EQ. 9 as:

$$p(S_t | Y_t, B_t) \propto \int_x N(Y_t; X_t, \sigma_u^2 + g^2\sigma_v^2) \cdot N\left(G\frac{g^2\sigma_v^2(Y_t - X_t)}{\sigma_u^2 + g^2\sigma_v^2}; B_t - HX_t, \sigma_w^2 + |G|^2\frac{g^2\sigma_v^2\sigma_u^2}{\sigma_u^2 + g^2\sigma_v^2}\right) \cdot p(X_t | S_t)p(S_t)dx \qquad \text{EQ. 12}$$

which can be simplified as:

$$p(S_t | Y_t, B_t) \propto N\left(B_t; \frac{(\sigma_s^2H + g^2\sigma_v^2G)Y_t}{\sigma_s^2 + g^2\sigma_v^2 + \sigma_u^2}, \sigma_w^2 + |G|^2\frac{g^2\sigma_v^2\sigma_u^2}{\sigma_u^2 + g^2\sigma_v^2} + \left|H - G\frac{g^2\sigma_v^2}{\sigma_u^2 + g^2\sigma_v^2}\right|^2\frac{\sigma_s^2(\sigma_u^2 + g^2\sigma_v^2)}{\sigma_s^2 + \sigma_u^2 + g^2\sigma_v^2}\right) N(Y_t; 0, \sigma_s^2 + \sigma_u^2 + g^2\sigma_v^2)p(S_t) \qquad \text{EQ. 13}$$

A close look at EQ. 13 reveals that the first term is in some sense modeling the correlation between the alternative sensor channel and the air conduction microphone channel whereas the second term makes use of the state model and the noise model to explain the observation in the air microphone channel. The third term is simply the prior on the state, which under one embodiment is a uniform distribution.

The likelihood of the state given the observation as computed in EQ. 13 has two possible applications. First, it can be used to build a speech-state classifier, which can be used to classify the observations as including speech or not including speech so that the variances of the noise sources can be determined from frames that do not include speech. It can also be used to provide a "soft" weight when estimating the clean speech signal as shown further below.

As noted above, each of the variables in the above equations is defined for a particular frequency component in the complex spectral domain. Thus, the likelihood of EQ. 13 is for a state associated with a particular frequency component. However, since there is only a single state variable for each frame, the likelihood of a state for a frame is formed by aggregating the likelihood across the frequency components as follows:

$$L(S_t) - \prod_f L(S_t(f)) \qquad \text{EQ. 14}$$

where $L(S_t(f))=p(S_t(f)|Y_t(f),B_t(f))$ is the likelihood for the frequency component f as defined in EQ. 13. The product is determined over all frequency components except the DC and Nyquist frequencies. Note that if the likelihood computation is carried out in the log-likelihood domain, then the product in the above equation is replaced with a summation.

The above likelihood can be used to build a speech/non-speech classifier, based on a likelihood ratio test such that:

$$r = \log\frac{L(S_t = \text{speech})}{L(S_t = \text{non-speech})} \qquad \text{EQ. 15}$$

where a frame is considered to contain speech if the ratio r is greater than 0 and is considered to not contain speech otherwise.

Using the likelihood of the speech states, an estimate of the clean speech signal can be formed. Under one embodiment, this estimate is formed using a minimum mean square estimate (MMSE) based on EQ. 6 above such that:

$$\hat{X}_t = E(X_t|Y_t, B_t) = \sum_{s\in\{S\}} p(S_t = s|Y_t, B_t)E(X_t|Y_t, B_t, S_t = s) \qquad \text{EQ. 16}$$

where $E(X_t|Y_t,B_t)$ is the expectation of the clean speech signal given the observation, and $E(X_t|Y_t,B_t,S_t=s)$ is the expectation of the clean speech signal given the observations and the speech state.

Using equations 7 and 9, the conditional probability $p(X_t|Y_t,B_t,S_t=s)$ from which the expectation $E(X_t|Y_t,B_t,S_t=s)$ can be calculated is determined as:

$$p(X_t|Y_t, B_t, S_t = s) \propto \qquad \text{EQ. 17}$$

$$N(Y_t; X_t, \sigma_u^2 + g^2\sigma_v^2)\cdot N\left(\frac{g^2\sigma_v^2 G(Y_t - X_t)}{\sigma_u^2 + g^2\sigma_v^2}; B_t - HX_t, \sigma_w^2 + \frac{g^2\sigma_v^2\sigma_u^2|G|^2}{\sigma_u^2 + g^2\sigma_v^2}\right)\cdot N(X_t; 0, \sigma_s^2)p(S_t = s)$$

This produces an expectation of:

$$E(X_t|Y_t, B_t, S_t = s) = \sigma_s^2\left(\frac{\sigma_p^2 Y_t + M*((\sigma_u^2 + g^2\sigma_v^2)B_t - g^2\sigma_v^2 GY_t)}{\sigma_p^2(\sigma_u^2 + g^2\sigma_v^2 + \sigma_s^2) + |M|^2\sigma_s^2(\sigma_u^2 + g^2\sigma_v^2)}\right) \qquad \text{EQ. 18}$$

where $$\sigma_p^2 = \sigma_w^2 + \frac{g^2\sigma_v^2\sigma_u^2}{\sigma_u^2 + g^2\sigma_v^2}|G|^2 \qquad \text{EQ. 19}$$

$$M = H - \frac{g^2\sigma_v^2}{\sigma_u^2 + g^2\sigma_v^2}G \qquad \text{EQ. 20}$$

and M* is the complex conjugate of M.

Thus, the MMSE estimate of the clean speech signal $X_t$ is given by:

$$\hat{X}_t = \sum_{s\in\{S\}} \pi_s E(X_t|Y_t, B_t, S_t = s) \qquad \text{EQ. 21}$$

where $\pi_s$ is the posterior on the state and is given by:

$$\pi_s = \frac{L(S_t = s)}{\sum_{s\in\{S\}} L(S_t = s)} \qquad \text{EQ. 22}$$

where $L(S_t=s)$ is given by EQ. 14. Thus, the estimate of the clean speech signal is based in part on the relative likelihood of a particular speech state and this relative likelihood provides a soft weight for the estimate of the clean speech signal.

In the calculations above, H was assumed to be known with strong precision. However, in practice, H is only known with limited precision. Under an additional embodiment of the present invention, H is modeled as a Guassian random variable $N(H; H_0,\sigma_H^2)$. Under such an embodiment, all of the calculations above are marginalized over all possible values of H. However, this makes the mathematics intractable. Under one embodiment, an iterative process is used to overcome this intractability. During each iteration, H is replaced in equations 13 and 20 with $H_0$ and $\sigma_w^2$ is replaced with $\sigma_w^2+|\hat{X}_t|^2\sigma_H^2$ where $\hat{X}_t$ is an estimate of the clean speech signal determined from a previous iteration. The clean speech signal is then estimated using EQ. 21. This new estimate of the clean speech signal is then set as the new value of $\hat{X}_t$ and the next iteration is performed. The iterations end when the estimate of the clean speech signal becomes stable.

Figure 6:
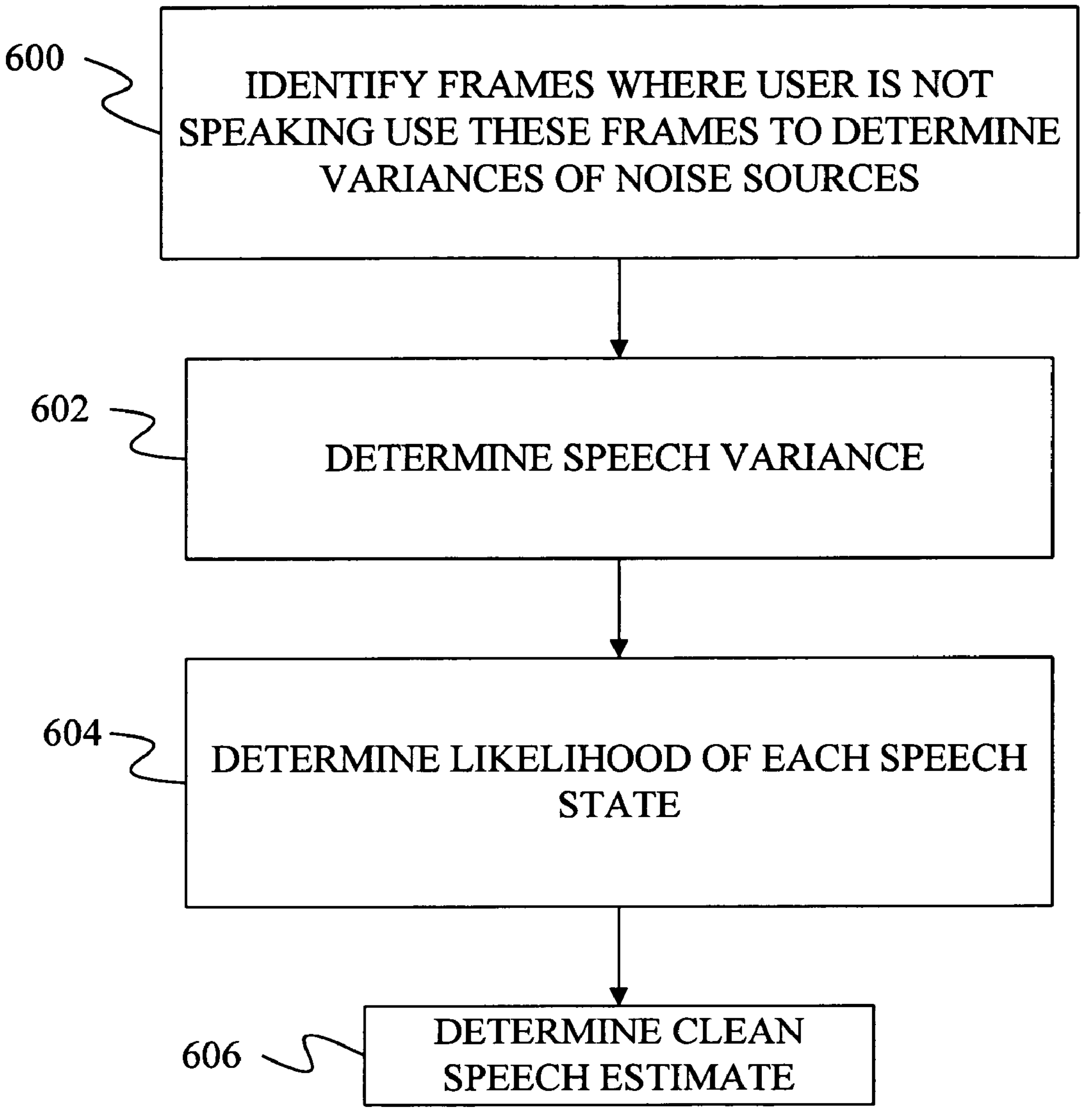
FIG. 6 is a flow diagram for enhancing speech under an embodiment of the present invention.

FIG. 6 provides a method of estimating a clean speech signal using the equations above. In step 600, frames of an input utterance are identified where the user is not speaking. These frames are then used to determine the variance for the ambient noise $\sigma_v^2$, the variance for the alternative sensor noise $\sigma_w^2$ and the variance for the air conduction microphone noise $\sigma_u^2$.

To identify frames where the user is not speaking, the alternative sensor signal can be examined. Since the alternative sensor signal will produce much smaller signal values for background speech than for noise, when the energy of the alternative sensor signal is low, it can initially be assumed that the speaker is not speaking. The values of the air conduction microphone signal and the alternative sensor signal for frames that do not contain speech are stored in a buffer and are used to compute variances of the noise as:

$$\hat{\sigma}_v^2 = \frac{1}{N_v}\sum_{all\ t\in V}|Y_t|^2 \qquad \text{EQ. 23}$$

$$\hat{\sigma}_w^2 = \frac{1}{N_v}\sum_{all\ t\in V}|B_t'|^2 \qquad \text{EQ. 24}$$

where $N_v$ is the number of noise frames in the utterance that are being used to form the variances, V is the set of noise frames where the user is not speaking, and $B_t'$ refers to the alternative sensor signal after leakage has been accounted for, which is calculated as:

$$B'_t=B_t-GY_t \qquad \text{EQ. 25}$$

which in some embodiments is alternatively calculated as:

$$B_t' = \left(1 - \frac{|GY_t|}{|B_t|}\right)B_t \quad \text{EQ. 26}$$

Under some embodiments, the technique of identifying non-speech frames based on low energy levels in the alternative sensor signal is only performed during the initial frames of training. After initial values have been formed for the noise variances, they may be used to determine which frames contain speech and which frames do not contain speech using the likelihood ratio of EQ. 15.

The value of g, which is a tuning parameter that can be used to either increase or decrease the estimated variance $\sigma_v^2$, is set to 1 under one particular embodiment. This suggests complete confidence in the noise estimation procedure. Different values of g may be used under different embodiments of the present invention.

The variance of the noise for the air conduction microphone, $\sigma_u^2$, is estimated based on the observation that the air conduction microphone is less prone to sensor noise than the alternative sensor. As such, the variance of the air conduction microphone can be calculated as:

$$\sigma_u^2 = 1e^{-4}\sigma_w^2 \quad \text{EQ. 27}$$

At step 602, the speech variance $\sigma_s^2$ is estimated using a noise suppression filter with temporal smoothing. The suppression filter is a generalization of spectral subtraction. Specifically, the speech variance is calculated as:

$$\hat{\sigma}_s^2 = \tau|\hat{X}_{t-1}|^2 + (1-\tau)K_s^2|Y_t|^2 \quad \text{EQ. 28}$$

where $$K_s = \begin{cases} [1 - \alpha Q^{\gamma 1}]^{\gamma 2} & \text{if } Q^{\gamma 1} < 1/(\alpha + \beta) \\ [\beta Q^{\gamma 1}]^{\gamma 2} & \text{otherwise} \end{cases} \quad \text{EQ. 29}$$

with $$Q = \frac{\sigma_v}{|Y_t|} \quad \text{EQ. 30}$$

where $\hat{X}_{t-1}$ is the clean speech estimate from the preceding frame, $\tau$ is a smoothing factor which in some embodiments is set to 0.2, $\alpha$ controls the extent of noise reduction such that if $\alpha>1$, more noise is reduced at the expense of increase speech distortion, and $\beta$ gives the minimum noise floor and provides a means to add background noise to mask the perceived residual musical noise. Under some embodiments, $\gamma 1=2$ and $\gamma 2=\frac{1}{2}$. In some embodiments, $\beta$ is set equal to 0.01 for 20 dB noise reduction for pure noise frames.

Thus, in EQ. 28, the variance is determined as a weighted sum of the estimated clean speech signal of the preceding frame and the energy of the air conduction microphone signal filtered by the noise suppression filter $K_s$.

Under some embodiments, $\alpha$ is chosen according to a signal to noise ratio and a masking principle which has shown that the same amount of noise in a high speech energy band has a smaller impact in perception than in a low speech energy band and the presence of high speech energy at one frequency will reduce the perception of noise in an adjacent frequency band. Under this embodiment, $\alpha$ is chosen as:

$$\alpha = \begin{cases} \alpha_0(1 - SNR/B) & \text{if } SNR < B \\ 0 & \text{otherwise} \end{cases} \quad \text{EQ. 31}$$

where SNR is the signal-to-noise ratio in decibels (dB), B is the desired signal-to-noise ratio level above which noise reduction should not be performed and $\alpha_0$ is the amount of noise that should be removed at a signal-to-noise ratio value of 0. Under some embodiments, B is set equal to 20 dB.

Using a definition of signal to noise ratio of:

$$SNR = 10\log\left(\frac{|Y_t|^2 - \sigma_v^2}{\sigma_v^2}\right) \quad \text{EQ. 32}$$

the noise suppression filter of EQ. 29 becomes:

$$K_s = \begin{cases} [1 - \alpha_0(1 - SNR/B)/(1 + 10^{SNR/10})]^{1/2} & \text{if } Q^2 < 1/(\alpha + \beta) \\ [\beta Q^2]^{1/2} & \text{otherwise} \end{cases} \quad \text{EQ. 33}$$

This noise suppression filter provides weak noise suppression for positive signal-to-noise ratios and stronger noise suppression for negative signal-to-noise ratios. In fact, for sufficiently negative signal-to-noise ratios, all of the observed signal and noise are removed and the only signal present is a noise floor that is added back by the "otherwise" branch of the noise suppression filter of Eq. 33.

Under some embodiments, $\alpha_0$ is made frequency-dependent such that different amounts of noise are removed for different frequencies. Under one embodiment, this frequency dependency is formed using a linear interpolation between $\alpha_0$ at 30 Hz and $\alpha_0$ at 8 KHz such that:

$$\alpha_0(k) = \alpha_{0min} + (\alpha_{0max} - \alpha_{0min})k/225 \quad \text{EQ. 34}$$

where k is the count of the frequency component, $\alpha_{0min}$ is the value of $\alpha_0$ desired at 30 Hz, $\alpha_{0max}$ is the $\alpha_0$ desired at 8 KHz and it is assumed that there are 256 frequency components.

After the speech variance has been determined at step 602, the variances are used to determine the likelihood of each speech state at step 604 using equations 13 and 14 above. The likelihood of the speech states is then used in step 606 to determine a clean speech estimate for the current frame. As noted above, in embodiments in which a Gaussian distribution is used to represent H, steps 604 and 606 are iterated using the latest estimate of the clean speech signal in each iteration and using the changes to the equations discussed above to accommodate the Gaussian model for H.

Although the present invention has been described with reference to particular embodiments, workers skilled in the art will recognize that changes may be made in form and detail without departing from the spirit and scope of the invention.

What is claimed is:

1. A method of determining an estimate for a noise-reduced value representing a portion of a noise-reduced speech signal, the method comprising:

generating an alternative sensor signal using an alternative sensor;

generating an air conduction microphone signal;

using the alternative sensor signal and the air conduction microphone signal to estimate a likelihood, $L(S_t)$ of a speech state, $S_t$ by estimating a separate likelihood of the speech state for each of a set of frequency components and combining the separate likelihoods to form the likelihood of the speech state; and using the likelihood of the speech state to estimate the noise-reduced value, $\hat{X}_t$, as:

$$\hat{X}_t = \sum_{s \in \{S\}} \pi_s E(X_t \mid Y_t, B_t, S_t = s)$$

where $\pi_s$ is a posterior on the state and is given by:

$$\pi_s = \frac{L(S_t = s)}{\sum_{s\in\{S\}} L(S_t = s)}$$

and where:

$$E(X_t \mid Y_t, B_t, S_t = s) = \sigma_s^2\left(\frac{\sigma_p^2 Y_t + M * ((\sigma_u^2 + g^2\sigma_v^2)B_t - g^2\sigma_v^2 G Y_t)}{\sigma_p^2(\sigma_u^2 + g^2\sigma_v^2 + \sigma_s^2) + |M|^2\sigma_s^2(\sigma_u^2 + g^2\sigma_v^2)}\right)$$

where:

$$\sigma_p^2 = \sigma_w^2 + \frac{g^2\sigma_v^2\sigma_u^2}{\sigma_u^2 + g^2\sigma_v^2}|G|^2 \text{ and}$$

$$M = H - \frac{g^2\sigma_v^2}{\sigma_u^2 + g^2\sigma_v^2}G$$

where M* is the complex conjugate of M, $X_t$ is a noise reduced value, $Y_t$ is a value for a frame t of the air conduction microphone signal, $B_t$ is a value for a frame t of the alternative sensor signal, $\sigma_u^2$ is a variance of sensor noise in the air conduction microphone, $\sigma_w^2$ is a variance of sensor noise in the alternative sensor, $g^2\sigma_v^2$ is the variance of ambient noise, G is the channel response of the alternative sensor to ambient noise, H is the channel response of the alternative sensor to a clean speech signal, S is the set of all speech states, $\sigma_s^2$ is a variance for a distribution that models a probability of a noise-reduced value given a speech state and $E(X_t|Y_t,B_t,S_t=s)$ is the expectation of $X_t$ given $Y_t$, $B_t$, and a speech state of s.

2. The method of claim 1 further comprising using the estimate of the likelihood of a speech state to determine if a frame of the air conduction microphone signal contains speech.

3. The method of claim 2 further comprising using a frame of the air conduction microphone signal that is determined to not contain speech to determine a variance for a noise source and using the variance for the noise source to estimate the noise-reduced value.

4. The method of claim 1 further comprising estimating the variance of the distribution as a linear combination of an estimate of a noise-reduced value for a preceding frame and a filtered version of the air conduction microphone signal for a current frame.

5. The method of claim 4 wherein the filtered version of the air conduction microphone signal is formed using a filter that is frequency dependent.

6. The method of claim 4 wherein the filtered version of the air conduction microphone signal is formed using a filter that is dependent on a signal-to-noise ratio.

7. The method of claim 1 further comprising performing an iteration by using the estimate of the noise-reduced value to form a new estimate of the noise-reduced value.

8. A computer storage medium having stored thereon computer-executable instructions that when executed by a processor cause the processor to perform steps comprising:

receiving an alternative sensor signal generated using an alternative sensor;

receiving an air conduction microphone signal generated using an air conduction microphone;

determining a likelihood of a speech state based on the alternative sensor signal and the air conduction microphone signal by estimating a separate likelihood of the speech state for each frequency, $L(S_t(f))$, of a set of frequency components and forming a product of the separate likelihoods to form the likelihood of the speech state, $L(S_t)$ as:

$$L(S_t) = \prod_f L(S_t(f)),$$

where the product is taken across all frequency components f in the set of frequency components; and using the likelihood of the speech state to estimate a clean speech value.

9. The computer storage medium of claim 8 wherein using the likelihood of the speech state to estimate a clean speech value comprises weighting an expectation value.

10. The computer storage medium of claim 8 wherein using the likelihood of the speech state to estimate a clean speech value comprises:

using the likelihood of the speech state to identify a frame of a signal as a non-speech frame;

using the non-speech frame to estimate a variance for a noise; and using the variance for the noise to estimate the clean speech value.

11. A method of identifying a clean speech value for a clean speech signal, the method comprising:

receiving an alternative sensor signal generated using an alternative sensor;

receiving an air conduction microphone signal generated using an air conduction microphone;

forming a model wherein the clean speech signal is dependent upon a speech state, the alternative sensor signal is dependent upon the clean speech signal, and the air conduction microphone signal is dependent upon the clean speech signal, wherein forming the model comprises modeling a probability of a value of the clean speech signal given a speech state as a distribution having a variance; and determining a filtered value of the air conduction microphone signal by applying a value for a current frame of the air conduction microphone signal to a frequency-dependent noise suppression filter that is a function of a variance of ambient noise;

determining the variance of the distribution as a linear combination of an estimate of a value for a clean speech signal for a preceding frame and the filtered value of the air conduction microphone signal as $\hat{\sigma}_s^2=\tau|\hat{X}_{t-1}|^2+(1-\tau)K_s^2|Y_t|^2$, where $\hat{\sigma}_s^2$ is the variance of the distribution, $\hat{X}_{t-1}$ is the clean speech estimate from the preceding frame, $\tau$ is a smoothing factor, $|Y_t|^2$ is the value for the current frame of the air conduction microphone signal and $K_s$ is the noise suppression filter;

determining an estimate of the clean speech value for the current frame based on the model, the variance of the distribution, a value for the alternative sensor signal for the current frame, and a value for the air conduction microphone signal for the current frame.

12. The method of claim 11 further comprising determining a likelihood for a state and wherein determining an estimate of the clean speech value further comprises using the likelihood for the state.

13. The method of claim 11 wherein forming the model comprises forming a model wherein the alternative sensor signal and the air conduction microphone signal are dependent upon a noise source.

* * * * *